Aug. 5, 1958 — A. J. MORNEAU — 2,846,212
BICYCLE SHIFT CABLE ADAPTER
Filed Feb. 10, 1954 — 2 Sheets-Sheet 1
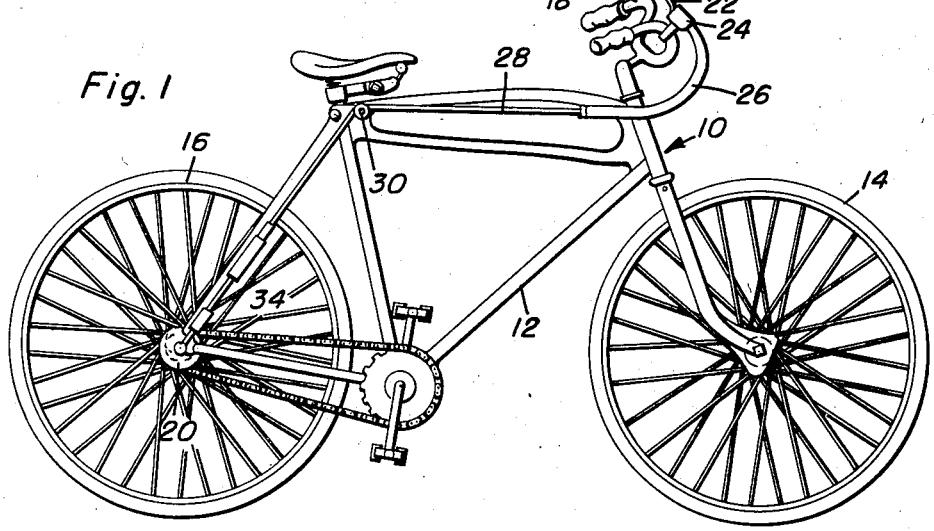
Fig. 1
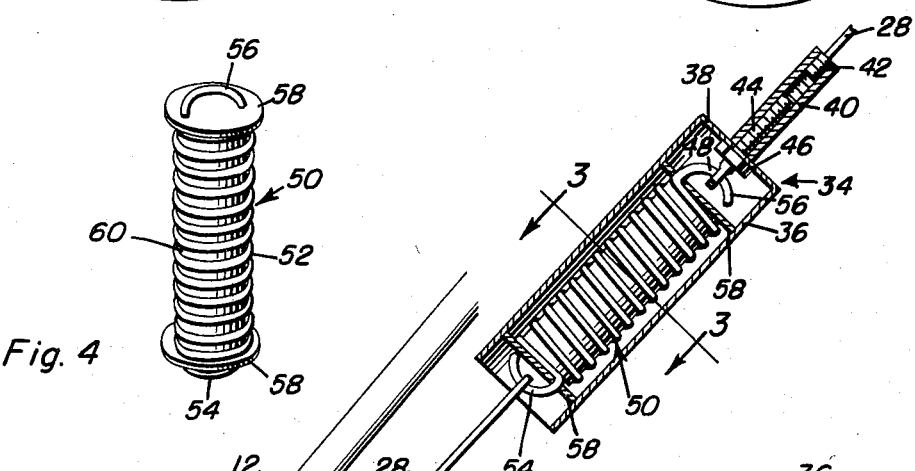
Fig. 4
Fig. 2
Fig. 3
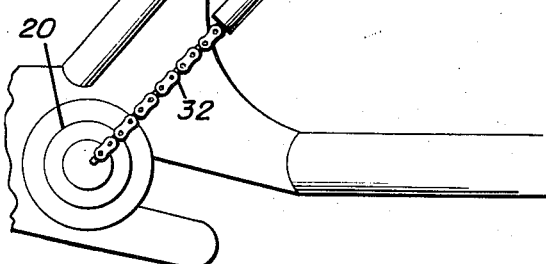
Arthur J. Morneau
INVENTOR.

Aug. 5, 1958        A. J. MORNEAU        2,846,212
BICYCLE SHIFT CABLE ADAPTER
Filed Feb. 10, 1954        2 Sheets—Sheet 2
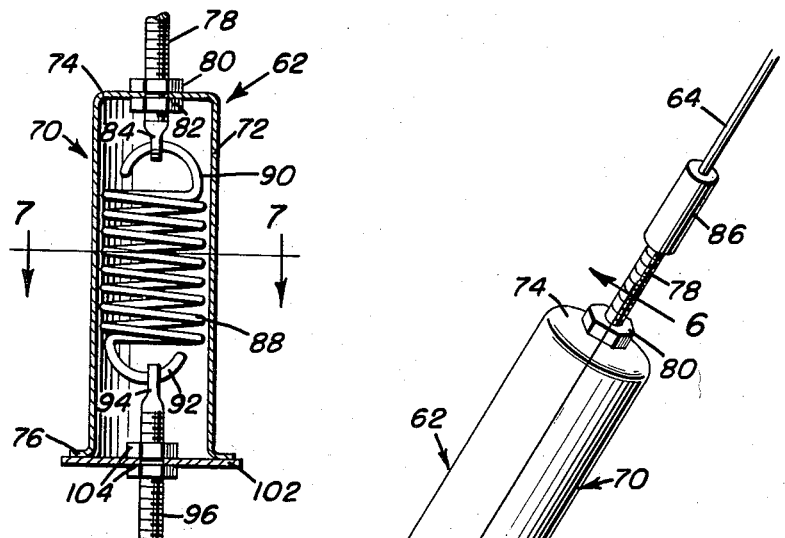
Fig. 6
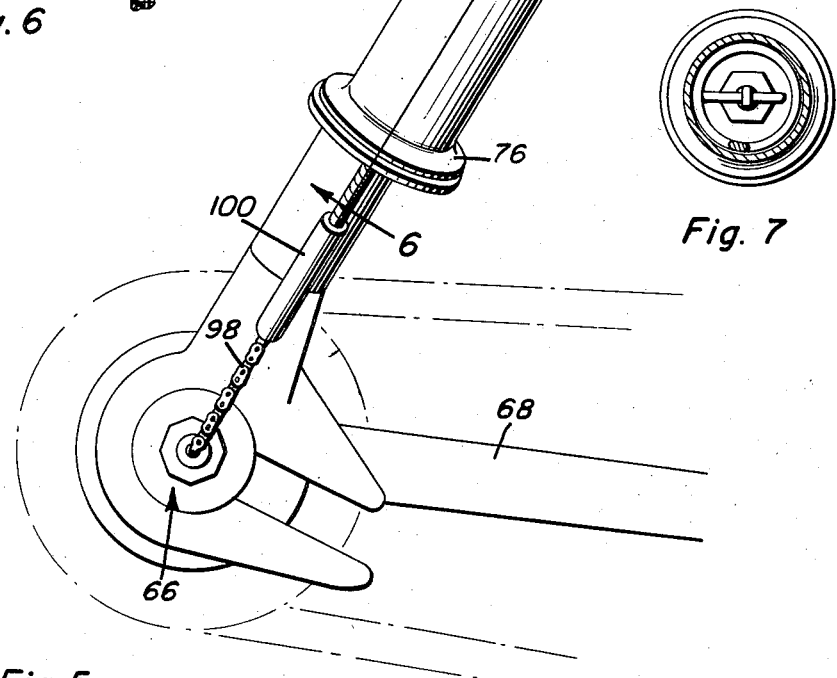
Fig. 7
Fig. 5
Arthur J. Morneau
INVENTOR.
BY *Clarence A. O'Brien*
*and Harvey B. Jackson*
            Attorneys United States Patent Office 2,846,212
Patented Aug. 5, 1958

2,846,212

BICYCLE SHIFT CABLE ADAPTER

Arthur J. Morneau, Midland, Tex.

Application February 10, 1954, Serial No. 409,492

4 Claims. (Cl. 267—74)

This invention relates in general to attachments for bicycles, and more specifically, an adapter for a bicycle shift cable.

At the present time there are on the market several types of bicycle gear shifts which are actuated from the handle bar of the bicycle through the use of a control cable. The control cable is lever actuated and the construction of the shift unit is such that unless certain of the elements of the shift unit are properly positioned it cannot be shifted irrespective of the tension placed on the cable. Accordingly, when the cable is tensioned and the elements of the shift unit are not in proper position for shifting, either elements of the shift unit or the cable are broken.

It is therefore the primary object of this invention to provide an adapter which may be placed in a control cable for a bicycle gear shift unit, the adapter being of a nature whereby the tension which may be applied to the cable through continued movement of the actuating means attached thereto is limited so as to prevent breakage of either the control cable or elements of the gear shift unit.

Another object of this invention is to provide a tension limiting device which may be conveniently attached to a bicycle shift cable intermediate its ends, the adapter being of a nature whereby it may be conveniently attached to existing bicycles with a minimum of effort.

A still further object of this invention is to provide a tension limiting device for shift cables of bicycle gear shift units, the tension limiting device being of such a nature whereby a desired tension may be retained on a cable when not in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a bicycle equipped with a cable control gear shift unit, the cable being provided with the adapter which is the subject of this invention;

Figure 2 is an enlarged fragmentary side elevational view of the bicycle of Figure 1, and shows the general relationship of the adapter, the wheel of the bicycle being omitted and the adapter being broken away and shown in section in order to clearly illustrate its construction;

Figure 3 is an enlarged transverse sectional view taken substantially upon the plane indicated by the section line 3—3 of Figure 2 and shows the relationship of various components of the adapter;

Figure 4 is a rotated perspective view of the main tensioning device of the adapter;

Figure 5 is an enlarged fragmentary perspective view of the lower rear portion of the frame of a modified bicycle and showing a gear shift used thereon being provided with a modified form of adapter;

Figure 6 is an enlarged fragmentary sectional view taken substantially upon the plane indicated by the section line 6—6 of Figure 5 and shows the internal construction of the adapter; and Figure 7 is an enlarged transverse sectional view taken substantially upon the plane indicated by the section line 7—7 of Figure 6 and shows the relationship of the various portions of the adapter with respect to a housing thereof.

Referring now to the drawings in detail, it will be seen that there is illustrated in Figure 1 a conventional bicycle which is referred to in general by the reference numeral 10. The bicycle 10 includes a frame 12, a front wheel 14 and a rear wheel 16. The bicycle 10 also includes handle bars 18 and a gear shift unit 20 which is mounted in the rear wheel 16.

In order that the gear shift unit 20 may be conveniently operated by the rider of the bicycle 10, there is connected to the handle bars 18 a control lever 22 which is carried by a fitting 24. Attached to the fitting 24 is a flexible housing 26. Extending through the flexible housing 26 is an elongated control cable 28 which is connected to the control lever 22 for operation thereby. The control cable 28 is entrained over a pulley 30 carried by the rear portion of the frame 12 and connects to the gear shift unit 20 through a flexible operator 32 connected to the gear shift unit 20. In order that the cable 28 and elements of the gear shift unit 20 may not be accidentally broken, the cable 28 is provided intermediate the pulley 30 and the flexible operator 32 with the adapter which is the subject of this invention, the adapter being referred to in general by the reference numeral 34.

The adapter 34 includes a tubular casing 36 which is closed at its upper end by an end wall 38. Carried by the end wall 38 is a fitting which includes an internally threaded sleeve 40 disposed exteriorly of the casing 36. Adjustably threaded within the sleeve 40 is a fastener 42 which is carried by a rear end of a forward portion of the cable 28.

The fitting carried by the end wall 38 also includes a fastener 44 which is externally threaded and which is adjustably received within the sleeve 40. The fastener 44 passes through the end wall 38 and is locked in an adjusted position by a lock nut 46 which engages the inner surface of the end wall 38. The lower end of the fastener 44 terminates in an eye 48.

Referring now to Figure 4 in particular, it will be seen that there is illustrated a tension device which is referred to in general by the reference numeral 50. The tension device 50 includes an elongated tension spring 52 which is in the form of a coil spring. The tension spring 52 terminates at one end in a hook 54 and at the other end in a hook 56. Carried by the hooks 54 and 56 are collars 58. Disposed within the spring 52 and having its ends abutting the opposed surfaces of the collars 58 is a spacer 60.

Referring once again to Figure 2 in particular, it will be seen that the tension device 50 is disposed within the casing 36. The hook 56 of the tension device 50 is engaged with the eye 48 and the hook 54 is engaged by an upper end of a lower portion of the cable 28. The collars 58 are guidingly engaged with the inner surface of the casing 36.

The relationship of the spacer 60 with respect to the spring 52 is to pretension the spring 52 so that all of the slack may be taken out of the cable 28. In the normal operation of the gear shift unit 20 when the control cable 28 is provided with the adapter 34, the control cable 28 and the adapter 34 move as a unit to effect shifting of the elements of the gear shift unit 20. However, when the elements of the gear shift unit 20 are not in proper position for shifting and the control lever 22 is actuated to tension the control cable 28, the pressure applied to the control cable 28 causes the elongation of the spring 52 with the result that only limited tension is applied to the lower portion of the cable 28. It is to be understood that the tension required to stretch the coil spring 52 is less than that which would normally cause breaking of either the control cable 28 or the elements of the gear shift unit 20. Inasmuch as excess forces cannot be exerted on either the control cable 28 or elements of the gear shift unit 20, it will be seen that the adapter 34 prevents the accidental breakage of elements of the gear shift mechanism for the bicycle 10.

Referring now to Figures 5, 6 and 7, it will be seen that there is illustrated a modified form of adapter which is referred to in general by the reference numeral 62. The adapter 62 is connected at one end of a flexible cable 64 which is utilized to operate a shift unit 66 of a rear wheel of a bicycle which is referred to in general by the reference numeral 68. It is to be understood that the shift unit 66, the bicycle 68 and the flexible cable 64 are identical with the shift unit 20, the bicycle 10 and the flexible cable 28, respectively.

The adapter 62 includes a generally cylindrical shaped housing 70 which is formed of a cylindrical body portion 72 and an integral end wall 74 at one end thereof. The other end of the body portion 72 terminates in an outwardly directed annular flange 76.

Extending through the end wall 74 and adjustably retained with respect thereto is an externally threaded fastener 78 which is adjustably positioned with respect to the end wall 74 by a pair of lock nuts 80 and 82 engaging outer and inner surfaces, respectively, of the end wall 74. The lower end of the fastener 78 terminates in a flat portion 84 in the form of an eye. The lower or rear end of the flexible cable 64 is removably secured to the fastener 78 by a cap member 86. Disposed within the housing 70 is a coil spring 88. The coil spring 88 terminates at its upper end in a hook 90 which passes through the eye 84 so that the coil spring 88 is connected to the fastener 78. The coil spring 88 terminates at its lower end in a hook 92 which passes through an eye 94 formed at an upper end of an externally threaded fastener 96. The fastener 96 projects upwardly into the lower end of the housing 70 and has the lower end thereof connected to a flexible operator 98 for the gear shift unit 66 through the use of a cap 100.

Carried by the fastener 96 intermediate its ends in adjusted relation thereto is a circular plate 102. The circular plate 102 is retained in an adjusted position on the fastener 96 by lock nuts 104.

It is to be understood that the relationship of the circular plate 102 with respect to the housing 70 is such that when the circular plate 102 is in engagement with the annular flange 76, the coil spring 88 is under tension. In this manner the flexible cable 64 is always retained under tension.

In the event a control lever, such as the control lever 22, for the flexible cable 64 is actuated when the internal parts of the gear shift units 66 are not in proper position, the flexible cable 64, the adapter 62 and the flexible actuator 98 will not move as a unit as normally occurs, but the coil spring 88 will be stretched. This eliminates the applying of excessive pressures to the working parts of the gear shift unit 66 and additional strains on the flexible cable 64 which may be of such a nature to either break the elements of the gear shift unit 66 or the flexible cable 64. Through the provision of the adapter 62, it will be seen that a control lever for the gear shift unit 66 may be actuated at any time without damaging either the gear shift unit 66 or the flexible cable 64.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a control cable of a gear shift unit for a bicycle, a combined tensioning and tension limiting device comprising a tension spring attachable to a cable to form an intermediate portion thereof, a spacer disposed within said spring for retaining said spring in a predetermined tension, said spring having hooks at opposite ends thereof, collars carried by said hooks, said spacer being in abutting engagement with said collars.

2. In combination with a control cable of a gear shift unit for a bicycle, a combined tensioning and tension limiting device comprising a tension spring attachable to a cable to form an intermediate portion thereof, a spacer disposed within said spring for retaining said spring in a predetermined tension, said spring being mounted within a tubular casing, a cable connecting fitting at one end of said casing, said spring being connected to said casing by said fitting.

3. In combination with a control cable of a gear shift unit for a bicycle, a combined tensioning and tension limiting device comprising a tension spring attachable to a cable to form an intermediate portion thereof, means connected to said spring for retaining said spring in a predetermined tension, said spring being mounted within a tubular casing, a cable connecting fitting at one end of said casing, said spring being connected to said casing by said fitting.

4. In combination with a control cable of a gear shift unit for a bicycle, a combined tensioning and tension limiting device comprising a tension spring attachable to a cable to form an intermediate portion thereof, means connected to said spring for retaining said spring in a predetermined tension, said spring being mounted within a tubular casing, a cable connecting fitting at one end of said casing, said spring being connected to said casing by said fitting, said means including a plate carried by said spring remote from said fitting, said plate coacting with an opposite end of said casing to retain said spring in a tensioned state.

References Cited in the file of this patent

UNITED STATES PATENTS

| | | |
|---|---|---|
| 343,946 | Chamberlayne | June 15, 1886 |
| 553,214 | Patrick | Jan. 14, 1896 |
| 617,300 | Schneider | Jan. 3, 1899 |
| 1,610,770 | Greene | Dec. 14, 1926 |
| 1,690,957 | Tommins | Nov. 6, 1928 |

FOREIGN PATENTS

| | | |
|---|---|---|
| 148,952 | Australia | Nov. 7, 1952 |
| 1,032,933 | France | Apr. 1, 1953 |